(12) United States Patent
Hulse et al.

(10) Patent No.: US 6,915,062 B2
(45) Date of Patent: Jul. 5, 2005

(54) ILLUMINATING WAVEGUIDE

(75) Inventors: George Robert Hulse, Cookeville, TN (US); Joe Parton Young, Sparta, TN (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 30 days.

(21) Appl. No.: 10/092,335

(22) Filed: Mar. 6, 2002

(65) Prior Publication Data

US 2003/0169997 A1 Sep. 11, 2003

(51) Int. Cl.$^7$ .............................. G02B 6/10; G02B 6/26
(52) U.S. Cl. ..................... 385/146; 385/31; 385/901
(58) Field of Search .................... 385/31, 146, 901, 385/123–128, 15, 39, 197, 147; 352/84, 217, 511, 551, 556, 559, 560; 362/84, 217, 511, 551, 556, 559, 560

(56) References Cited

U.S. PATENT DOCUMENTS

| | | | |
|---|---|---|---|
| 2,135,480 A | 11/1938 | Birdseye | |
| 4,615,579 A | 10/1986 | Whitehead | |
| 4,740,225 A | 4/1988 | Cocito et al. | |
| 4,763,984 A | 8/1988 | Awai et al. | |
| 5,233,679 A | 8/1993 | Oyama | |
| 5,295,047 A | * 3/1994 | Windross | 362/26 |
| 5,339,382 A | 8/1994 | Whitehead | |
| 5,400,224 A | 3/1995 | DuNah et al. | |
| 5,432,876 A | 7/1995 | Appledorn et al. | |
| 5,495,400 A | 2/1996 | Currie | |
| 5,502,785 A | 3/1996 | Wang et al. | |
| 5,708,749 A | 1/1998 | Kacheria | |
| 5,715,347 A | 2/1998 | Whitehead | |
| 5,716,487 A | 2/1998 | Sumerak | |
| 6,278,827 B1 | * 8/2001 | Sugiyama et al. | 385/123 |
| 6,538,828 B1 | * 3/2003 | Redmond | 359/800 |

FOREIGN PATENT DOCUMENTS

WO   WO 200042456 A1 * 7/2000   ............ G02B/6/00

* cited by examiner

*Primary Examiner*—John D. Lee
*Assistant Examiner*—Sarah Song
(74) *Attorney, Agent, or Firm*—Howard & Howard

(57) ABSTRACT

An illuminating waveguide having first and second longitudinally-extending unitary portions of differing cross-sectional shape. In use, light is injected into the waveguide at, for example, an end face of the waveguide and the light travels along the length of the waveguide with a portion of the light refracting laterally out of the waveguide along some or all of its length. The second cross-sectional shape can be any of a large number of different conical shapes to help direct the internally reflecting light toward the first portion where it can laterally exit the waveguide. The first cross-sectional shape can take a variety of different forms depending upon the illumination and other aesthetic and functional requirements for a particular application. The surface of the first portion can be treated to control the emission of light from that surface. The surface of the second portion can have a reflective coating to enhance the internal reflection of light within the waveguide so that most of the light exits laterally through the surface of the first portion. This results in a waveguide that provides circumferentially-limited lateral light emission along some or all of its length. The waveguide can include longitudinally-extending flanges for mounting of the waveguide. The waveguide so constructed is particularly suited for automotive interior and exterior lighting applications.

27 Claims, 4 Drawing Sheets

ILLUMINATING WAVEGUIDE

TECHNICAL FIELD

The present invention relates generally to automotive interior and exterior lighting and, in particular, the invention relates to illuminating waveguides used in these automotive lighting applications.

BACKGROUND OF THE INVENTION

Both automotive and non-automotive lighting applications exist that utilize a longitudinally-extending light source to provide area or feature lighting. Various known lighting methods utilize neon gas, fluorescent gas, or incandescent lighting.

In non-automotive applications, a wide variety of elongated light sources have been proposed. For example, a basic lighting apparatus of this type is described in U.S. Pat. No. 2,135,480 issued Nov. 8, 1938 to Birdseye. This patent discloses a reflecting glow lamp (a gas discharge lamp) which can have a nonsymmetrical cross-section that includes a trough-shaped portion. The trough-shaped portion has an exterior coating of metallic silver and a flattened transmitting face that may be clear or frosted. A possible configuration of the trough-shaped portion is substantially parabolic so that the lamp emits a large portion of its light in a concentrated beam of substantially parallel rays. The gaseous discharge lamps may contain neon, argon, carbon dioxide, or any other gaseous medium suitable for the maintenance of a gaseous discharge between suitable electrodes.

Apart from elongated gas discharge and fluorescent light sources such as that disclosed by Birdseye, elongated light guides are known that laterally emit a portion of the light traveling through the light guide. For example, see U.S. Pat. No. 5,339,382 issued Aug. 16, 1994 to Whitehead disclosing a prism light guide luminaire with a directional output. The prism light guide luminaire consists of a hollow structure made of transparent dielectric material with opaque and light emitting surface portions that together form a selected cross-sectional configuration that provides illumination along its length at a single circumferential location. The luminaire has either a circular or an elliptical cross-sectional shape. Another elongated light guide design is disclosed in U.S. Pat. No. 5,715,347 issued Feb. 3, 1998 to Whitehead. The disclosed apparatus utilizes a prism light guide with confocal opposed parabolic sections that is able to localize the transverse motion of light rays. This results in the seams at the intersections of the parabolas not affecting most light rays propagated along the guide.

The concept of longitudinally-extending light sources has extended to include waveguides. One such extension is described in U.S. Pat. No. 5,432,876 issued Jul. 11, 1995 to Appeldorn et al., which discloses optical fibers having notches of varying depth located along their length to produce lateral emission of the light traveling through the fibers. The notches are positioned at a particular angular location on the fibers so that lateral emission of light occurs at only a specific circumferential region.

U.S. Pat. No. 5,708,749 issued Jan. 13, 1998 to Kacheria discloses a light rod that emits light laterally out of a surface or end region as a result of using one or more surface treatments. The light rod can be solid or hollow and receives light from a remote source via optical fibers. The light rod cross-section is depicted as circular, but can be conical as well.

Waveguides have also been used in automotive lighting. One such use is disclosed in U.S. Pat. No. 5,495,400 issued Feb. 27, 1996 to Currie and disclosing an optical fiber illumination device for exterior vehicle lighting. The disclosed apparatus can utilize a round optical fiber side-light cable that extends about the periphery of a vehicle body component, such as about the periphery of a car window or truck bed.

Although the above-noted prior art includes various light source designs that provide circumferentially-limited lateral light emission, each involves some complexity in design or manufacturing that reduces its usefulness as a low-cost illumination source for automotive lighting. For the Whitehead designs, the apparatus is somewhat more complex, thereby increasing manufacturing costs. For the Appeldorn et al. design, the notches are created using a secondary operation that increases the cost of manufacturing.

It is therefore a general object of the invention to provide a low-cost illuminating waveguide design that provides circumferentially-limited lateral light emission along the length of the waveguide using a waveguide structure designed to efficiently direct the light laterally out of the waveguide at a particular circumferential location or region.

SUMMARY OF THE INVENTION

In accordance with the invention there is provided an illuminating waveguide in the form of an elongated, solid, light transmitting body having first and second portions that extend lengthwise along the body. In use, light is injected into the waveguide at, for example, an end face of the waveguide and the light travels along the length of the waveguide with a portion of the light refracting laterally out of the waveguide along some or all of its length. The first portion of the waveguide has a first cross-sectional shape and the second portion has a conic cross-sectional shape which directs internally-reflected light towards said first portion for transmission out of the waveguide through a light-transmissive surface of the first portion. The second cross-sectional shape is different in shape than the first cross-sectional shape and can be any of a large number of different conical shapes to help direct the internally reflecting light toward the first portion where it can laterally exit the waveguide. The first cross-sectional shape can take a variety of different forms depending upon the illumination and other aesthetic and functional requirements for a particular application.

If desired, the surface of the second portion can be treated or otherwise configured to enhance the internal reflection of light within the waveguide so that most or all of the light exits laterally through the surface of the first portion. This results in a waveguide that provides circumferentially-limited lateral light emission along some or all of its length. For example, the surface of the second portion can be polished or provided with a reflective coating so that it operates as a reflector of the light traveling through the waveguide. Also, if desired, the surface of the first portion can be treated or otherwise configured to control the lateral emission of light from the surface. This can include polishing to decrease light emission or roughening of the surface to increase light emission.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
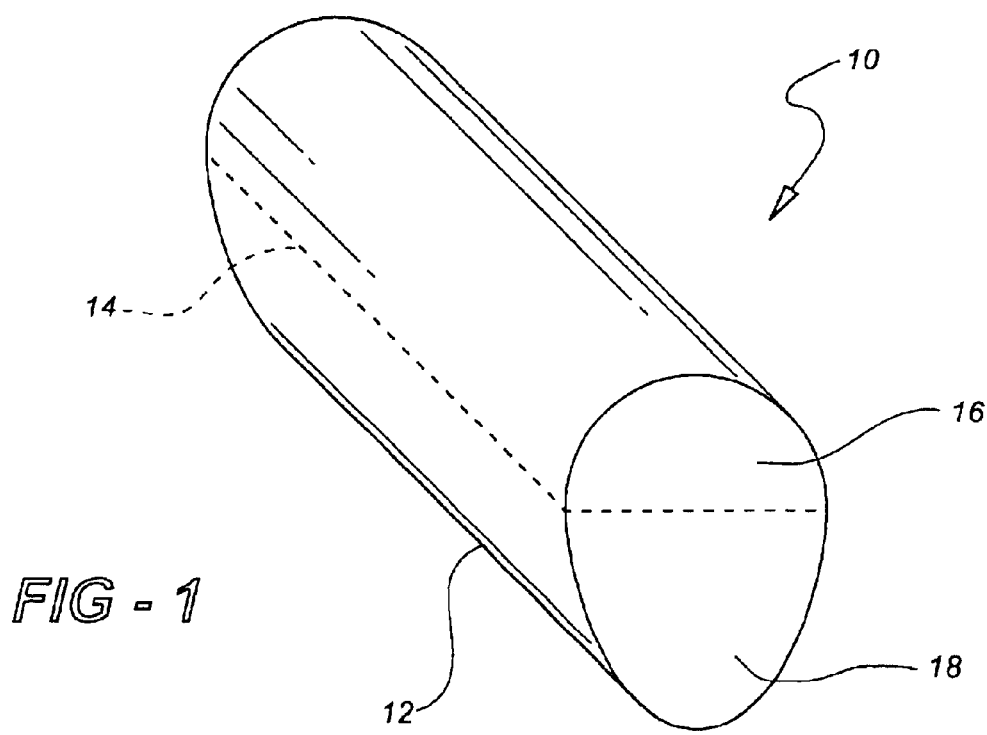
FIG. 1 is a perspective view of a first embodiment of an illuminating waveguide of the present invention.

FIG. 1 illustrates a first embodiment of an illuminating waveguide 10 of the present invention. In general, the waveguide 10 is an elongated solid light transmitting body 12 that can be considered as being formed from two portions that are actually unitary portions of the body 12 defined by an imaginary interface 14 that extends axially along the length of the waveguide. This interface 14 represents the point at which the cross-section of the waveguide changes from one conic cross-sectional shape to another. Thus, as is evident from the end face of waveguide 10, a first portion 16 of the waveguide has a semi-circular cross-sectional shape, whereas the second portion 18 has a parabolic cross-sectional shape. Waveguide 10 therefore has a compound-conic cross-sectional shape; that is, it has a cross-sectional shape that includes at least two portions or regions of differing conical shape.

The first (semi-circular) portion 16 has a light-transmissive surface so that a portion of the light traveling through the waveguide 10 will be refracted out of the waveguide through that surface to thereby provide lateral illumination from the waveguide along some or all of its length. This light-transmissive surface extends circumferentially around a first side of the waveguide between the outer extremes of the junction 14; that is, the surface extends from a first angular location to a second angular location. Similarly, the surface of the second (parabolic) portion 18 extends circumferentially around an opposite side of the waveguide 10 from the first angular location to the second angular location. As will be understood by those skilled in the art, the parabolic shape of the second portion 18 helps direct the internally reflected light toward the first portion 16 where it will be transmitted out of the waveguide 10 if the angle of incidence is above a critical angle that depends upon the indices of refraction for the waveguide and surrounding medium. Although depicted as a short segment in FIG. 1, it will be appreciated that in use, waveguide 10 will typically be much longer in length than shown in FIG. 1, with light being directed into the waveguide at one of its end faces from a suitable source, such as an incandescent or arc lamp.

Figure 2:
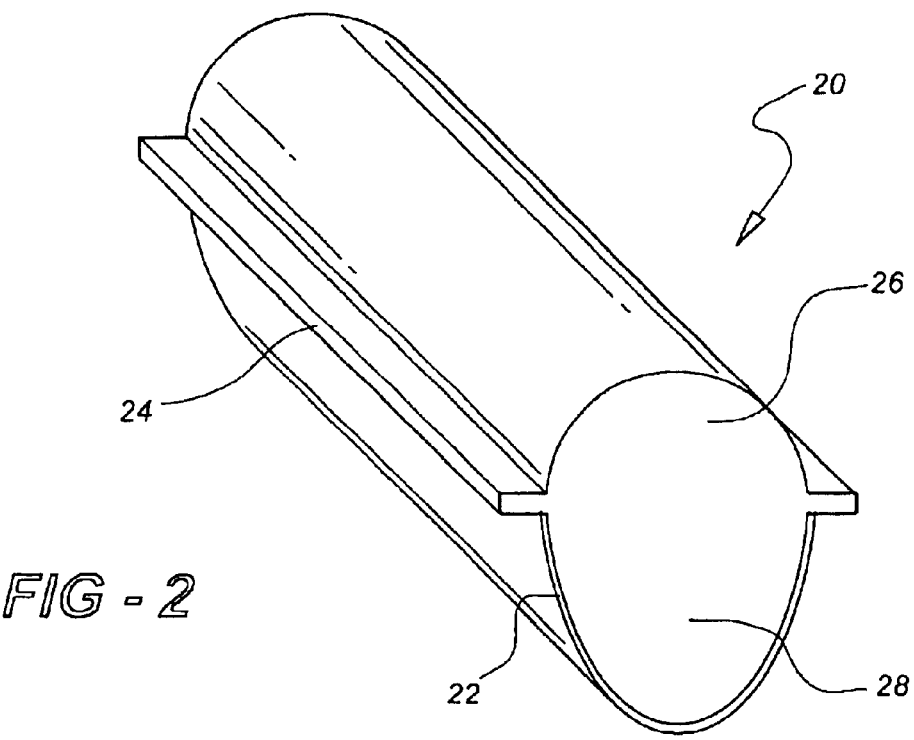
FIG. 2 is a perspective view of a second embodiment of an illuminating waveguide of the present invention.

Referring now to FIG. 2, there is shown a second embodiment of an illuminating waveguide 20 of the present invention. The waveguide 20 has the same construction as that of waveguide 10 of FIG. 1 except that waveguide 20 includes a reflective coating 22 and a pair of flanges 24 located on opposite sides of the waveguide at the junction between the semi-circular portion 26 and the parabolic portion 28. The reflective coating 22 provides internal reflection of the light that impinges within the waveguide upon the surface of the lower portion 28, regardless of the angle of incidence. This light is therefore directed into the upper portion 26 where some of the light escapes through the light-transmissive surface. In this embodiment, the lower portion 28 with its reflective coating 22 thus comprises a reflector that provides waveguide 20 with circumferentially-limited lateral emission of light along its length.

Figure 3:
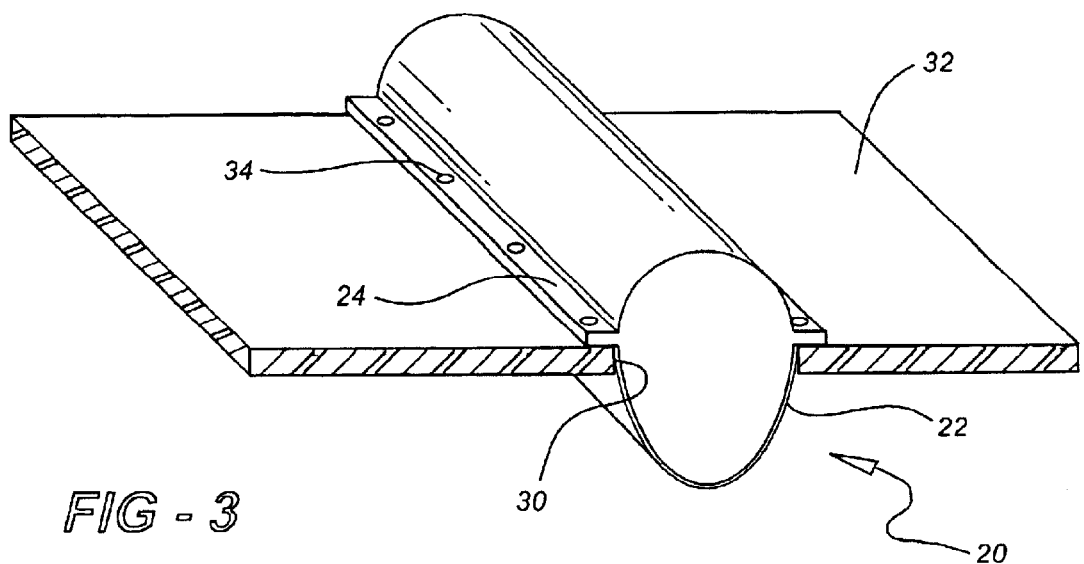
FIG. 3 is a perspective view of the illuminating waveguide of FIG. 2 configured with mounting holes for attachment of the waveguide within a slot in a vehicle body panel.

The flanges 24 can be used in mounting of the waveguide 20 a vehicle component such as a body panel or an interior or exterior trim component. As shown in FIG. 3, the waveguide 20 can be mounted within a slot 30 of an interior panel 32. The slot 30 has a width that is the same as the diameter or width of the waveguide at the location where the flanges 24 depend outwardly from the waveguide. Thus, the waveguide fits within slot 30 with the flanges overlying a small portion of the panel 32 on each side of the slot. As will be appreciated, the lateral emission of light is limited to only one side (the exposed side) of the interior panel 32 and thus very little light is lost behind the panel in the vehicle. Although the flanges 24 are shown in FIG. 3 as being located over the outer (exposed) side of the panel 32, it will be appreciated that the waveguide 20 could be mounted with the flanges underneath the panel. The waveguide 20 can be secured in place within slot 30 using any of a variety of known means such as adhesives or fasteners, as will be known by those skilled in the art. As shown, the waveguide can include spaced apertures 34 located on the flanges 24 which permit the waveguide to be snapped into place within the slot 30 using suitable pins (not shown) that interlock with the apertures 34.

Figure 4:
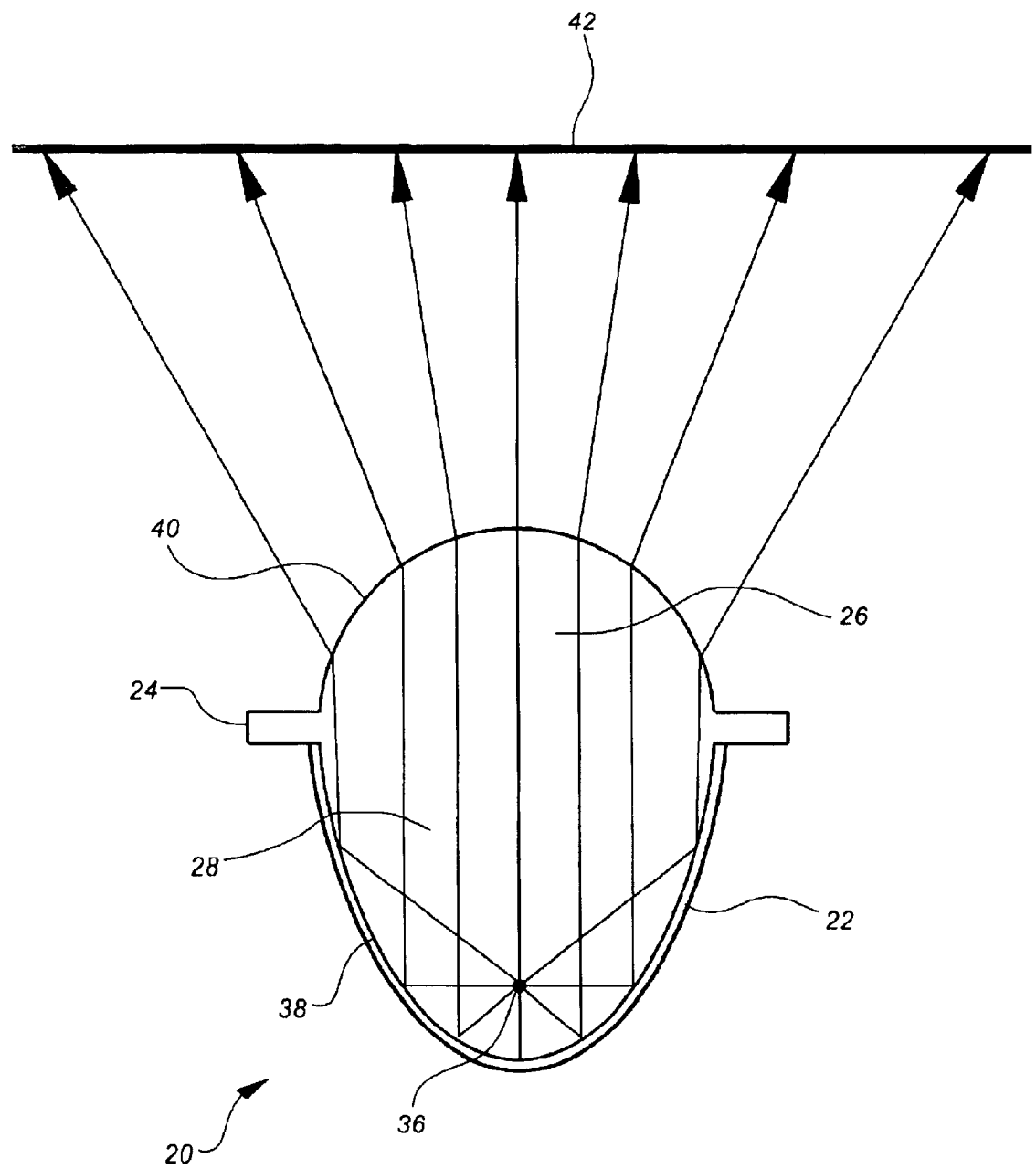
FIG. 4 is a cross-sectional view showing some of the light handling features of the second embodiment.

Referring now to FIG. 4, some of the light-handling features of the compound-conic cross-sectional shape of waveguide 20 will be described. As mentioned above, the conical shape of the lower portion 28 helps direct light upwardly toward the upper portion 26 where at least some of the light escapes the waveguide to provide the lateral illumination. More specifically, the parabolic cross-sectional shape of the lower portion includes a focus 36 such that light rays passing through the focus and reflecting from the parabolic lower surface 38 are directed upwards in a parallel manner. The conic (in this case semi-circular) shape of the light-transmissive surface 40 of the upper portion 26 provides diffuse emission of light from the waveguide 20 and this light can be used for aesthetic purposes or for functional purposes such as to illuminate another vehicle component 42. As will be understood by those skilled in the art, the light rays shown in FIG. 4 depict only the vertical (lateral) component of the light rays traveling through the waveguide 20 and that, as a result of the light rays originating at a source located at one end of the waveguide, the light rays will have a horizontal (longitudinal) component as well.

It will be appreciated that much of the light traveling through the waveguide 20 will not pass through the focus 36; however, where diffuse lighting is desired (as in most automotive lighting applications), it is not important for the waveguide to have any focusing or collimating effect on the emitted light. If desired, by suitable coupling of the light source to the waveguide input end face, the light can be directed somewhat towards the central region of the waveguide so that a substantial amount of light does pass through the focus 36.

The lateral light output of the waveguide 20 can be controlled in part by suitable surface treatment of the upper portion 26 of the waveguide. The surface 40 can be polished to some degree to lower light emission or can be roughened or textured to increase light output. These treatments can be added either as a part of the primary manufacturing step (for example, built into a mold used to form the waveguide) or can be provided by a secondary operation such as polishing or abrading the formed waveguide.

In addition to or in lieu of surface treatments, the surface 40 may be coated with a material having a different refractive index than that of the waveguide material so as to alter the critical angle and thus increase or decrease the light output. Any of these approaches can be applied along the entire length of the waveguide, or at select locations or at all locations but to a differing extent. For example, to maintain substantially uniform intensity of the emitted light along the length of the light emitting region of the waveguide 20, a roughening of the surface 40 can be used with the extent of the roughening increasing with increasing distance from the light input end of the waveguide. In the event a light source is used at both ends of the waveguide, the roughening can increase from both ends towards the middle point between the two ends.

As mentioned above, waveguide 20 includes a reflective coating 22 to thereby form a reflector on the lower portion 28 of the waveguide. This reflective coating can be implemented using a metallized coating or can be in the form of other materials that will increase the internal reflection of light to some degree. For example, the coating can be of a material (whether transparent or opaque) having an index of refraction that is different than the waveguide material so as to change the critical angle in a manner that increases internal reflectance. Alternatively, the coating can be a partially or completely opaque paint that achieves the increased reflectance. Also, in lieu of or in addition to the coating 22, the lower surface 38 can be polished to increase internal reflectance.

Figure 5:
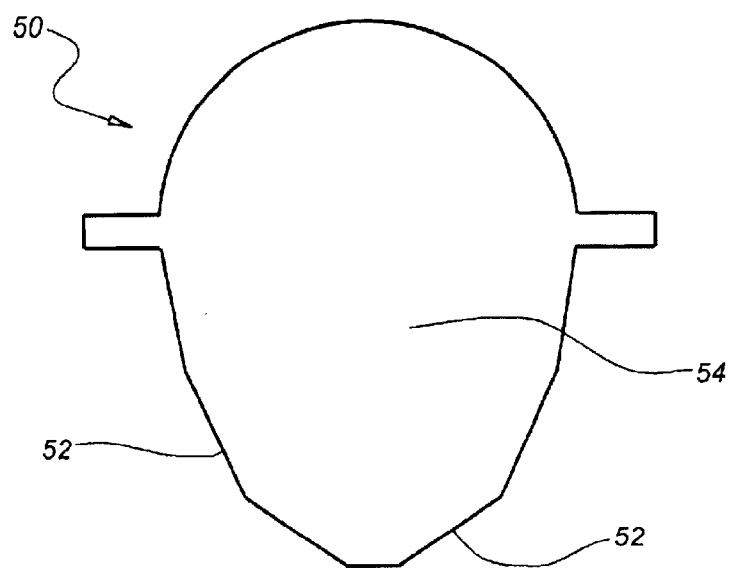
FIG. 5 is a cross-sectional view of a third embodiment of an illuminating waveguide of the present invention.

A variety of different conical shapes may be used for the upper and lower portions 26, 28 of waveguide 20, it being understood that as used herein, conic and its conjugates refer to arcuate shapes that are preferably, but not necessary, conic sections having one or more foci. In this regard, the term should also be understood to include cross-sections having an overall arcuate shape even though not constructed from a point-wise continuous curve. See, for example, the third embodiment shown in FIG. 5 which depicts a waveguide 50 having a faceted cross-sectional shape. Although each of the facets 52 are rectilinear, the lower portion 54 has an overall arcuate shape and is therefore considered herein to be conic.

Figure 6:
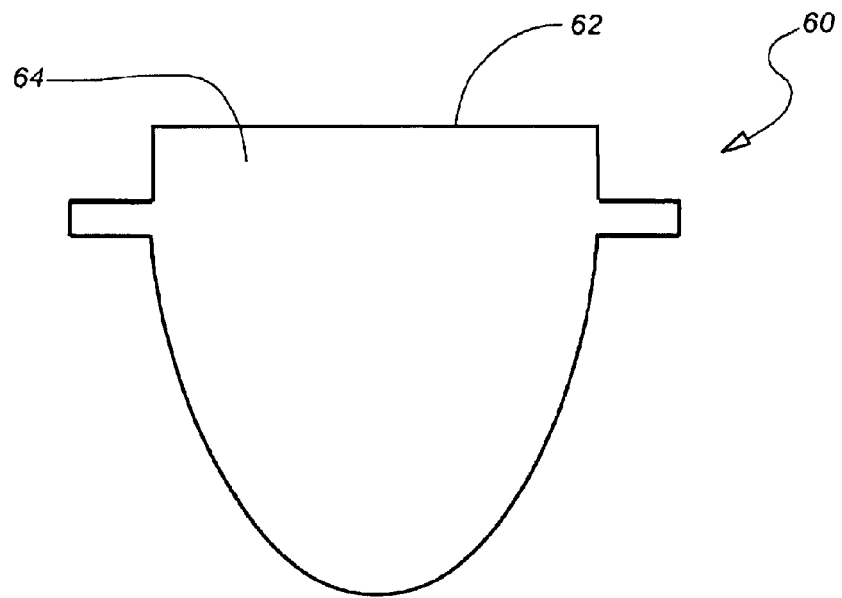
FIG. 6 is a cross-sectional view of a fourth embodiment of an illuminating waveguide of the present invention.
Figure 7:
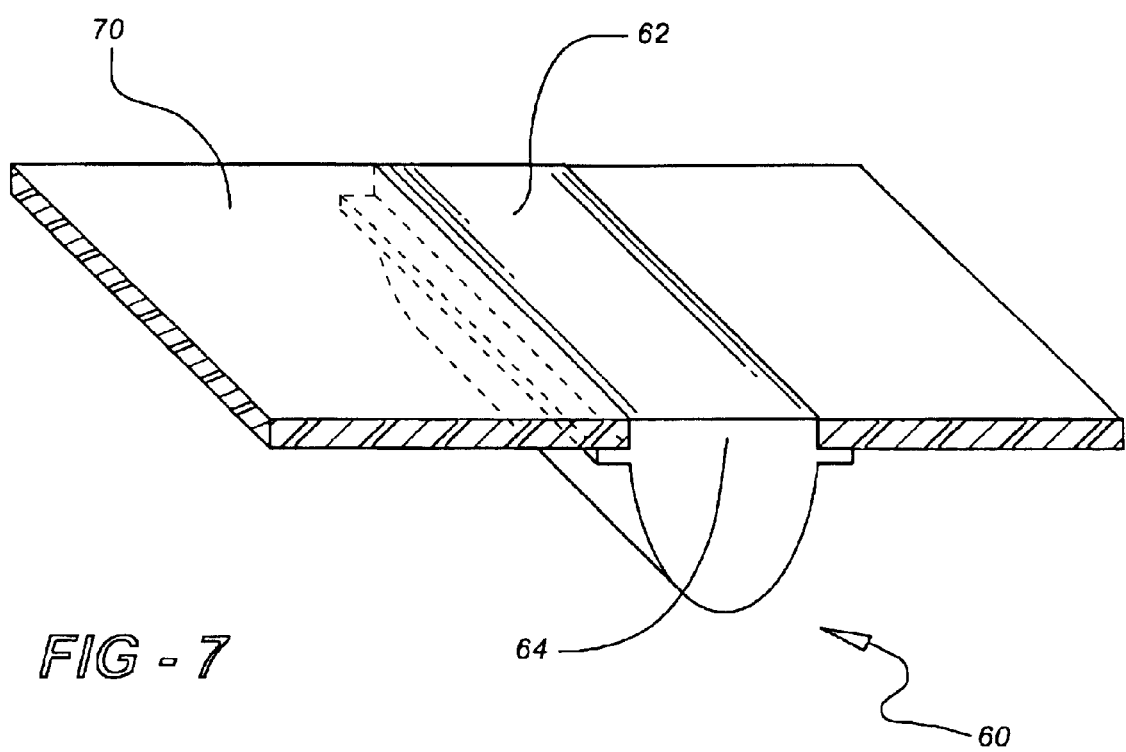
FIG. 7 is a perspective view of the illuminating waveguide of FIG. 6 mounted within a slot in a vehicle body panel.

The cross-sectional shape of the upper portion can be varied as well and need not even be conic. As illustrated by the fourth embodiment shown in FIG. 6, a waveguide 60 can be used that includes a flat surface 62 on its upper portion 64. This flat surface 62 provides minimal re-directing effect on the light exiting the waveguide through the surface. As shown in FIG. 7, this construction of waveguide 60 permits it to be mounted to an interior or exterior body panel (or other component) 70 with the surface 62 being flush with the surface of the panel 70.

The waveguides of the various illustrated embodiments can be formed from various light-transmitting materials; for example, a transparent plastic such as acrylic can be used. The waveguide can be inexpensively formed using various known manufacturing techniques such as injection molding or extrusion. The mounting flanges can comprise a unitary portion of waveguide or can be adhered or otherwise attached to the waveguide body in a separate operation. As will be appreciated, the illuminating waveguide disclosed herein can be used for a variety of automotive interior and exterior lighting applications. Exterior applications include aesthetic feature lighting, such as around windows or along significant vehicle body lines, and functional illumination of such things as running boards, luggage racks, and license plates. Interior applications also include both aesthetic lighting effects, such as along such things as armrests, headliners, and instrument panels, as well as functional illumination of, for example, foot wells, pockets, cupholders, storage bins, and consoles.

It will thus be apparent that there has been provided in accordance with the present invention an illuminating waveguide which achieves the aims and advantages specified herein. It will of course be understood that the foregoing description is of preferred exemplary embodiments of the invention and that the invention is not limited to the specific embodiments shown. Various changes and modifications will become apparent to those skilled in the art and all such variations and modifications are intended to come within the scope of the appended claims.

We claim:

1. An illuminating waveguide assembly comprising:
    a waveguide that includes on elongated solid light transmitting body having:
        a first portion extending lengthwise along said body and having a light transmissive surface, and
        a second portion extending lengthwise along said body; and
    a vehicle panel having an opening, said waveguide being positioned in said opening with said first portion being exposed at a front side of said panel and said second portion being located behind said panel;
    wherein said first portion has a first cross-sectional shape and said second portion has a second, conic cross-sectional shape which directs internally-reflected light towards said first portion such that the light is diffusely transmitted through said opening and out of said body via said light-transmissive surface, said second cross-sectional shape being different in shape than said first cross-sectional shape.

2. The illuminating waveguide assembly of claim 1, wherein said first cross-sectional shape is conic, whereby said body ham a compound conic cross-sectional shape.

3. The illuminating waveguide assembly of claim 1, wherein said light transmitting body is made of transparent plastic.

4. The illuminating waveguide assembly of claim 3, wherein the light transmitting body is made of acrylic.

5. The illuminating waveguide assembly of claim 1, wherein said second portion comprises a reflector.

6. The illuminating waveguide assembly of claim 5, further comprising a reflective coating on said second portion.

7. The illuminating waveguide assembly of claim 1, wherein said second cross-sectional shape has at least one focal point.

8. The illuminating waveguide assembly of claim 7, wherein said second cross-sectional shape is parabolic.

9. The illuminating waveguide assembly of claim 1, wherein said second cross-sectional shape is faceted.

10. The illuminating waveguide assembly of claim 1, wherein said first cross-sectional shape is semi-circular.

11. The illuminating waveguide assembly of claim 1, wherein said first cross-sectional shape is rectilinear.

12. The illuminating waveguide assembly of claim 1, wherein the light-transmissive surface of said first portion extends circumferentially around a first side of said body from a first angular location to a second angular location and wherein said second portion has a surface that extends circumferentially around an opposite side of said body from said first angular location to said second angular location.

13. The illuminating waveguide assembly of claim 12, further comprising a plurality of mounting flanges extending laterally away from said body at said first and second angular locations, wherein said waveguide is attached to said vehicle panel via said mounting flanges.

14. The illuminating waveguide assembly of claim 1, wherein said first and second portions extend from a first end of said elongated body to a second end of said elongated body.

15. An illuminating waveguide, comprising:
    an elongated solid light transmitting body having:
        a first portion extending lengthwise along said body and having a first surface, and
        a second portion extending lengthwise along said body and having a second surface;
        wherein said first surface is transmissive to light and said second portion has a conic cross-sectional shape to thereby direct light internally reflecting off said second surface towards said first surface, with the reflected light being diffusely transmitted out of said body through said first surface; and
        wherein said first portion and said second portion define the uppermost and lowermost portions of said waveguide respectively.

16. The illuminating waveguide of claim 15, wherein said first portion has a conic cross-sectional shape.

17. The illuminating waveguide of claim 15, wherein said light transmitting body is made of transparent plastic.

18. The illuminating waveguide of claim 17, wherein said light transmitting body is made of acrylic.

19. The illuminating waveguide of claim 15, wherein said second portion comprises a reflector.

20. The illuminating waveguide of claim 19, further comprising a reflective coating on said second portion.

21. The illuminating waveguide of claim 15, wherein said conic cross-section shape of said second portion has at least one focal point.

22. The illuminating waveguide of claim 15, wherein said conic cross-sectional shape of said second portion is faceted.

23. The illuminating waveguide of claim 15, wherein said first portion has a semi-circular cross-sectional shape.

24. The illuminating waveguide of claim 15, wherein said first surface of said first portion is rectilinear.

25. The illuminating waveguide of claim 15, wherein said first surface extends circumferentially around a first side body from a first angular location to a second angular location and wherein said second surface extends circumferentially around an opposite side of said body from said first angular location to said angular location.

26. The illuminating waveguide of claim 25, further comprising a plurality of mounting flanges extending laterally away from said body at said first and second angular locations.

27. The illuminating waveguide of claim 15, wherein said first and second portions extend from a first end of said elongated body to a second end of said elongated body.

* * * * *

UNITED STATES PATENT AND TRADEMARK OFFICE
CERTIFICATE OF CORRECTION

PATENT NO. : 6,915,062 B2
DATED : July 5, 2005
INVENTOR(S) : Hulse et al.

It is certified that error appears in the above-identified patent and that said Letters Patent is hereby corrected as shown below:

<u>Column 6,</u>
Line 23, replace "on" with -- an --.
Line 44, replace "ham" with -- has --.

Signed and Sealed this

Twentieth Day of September, 2005

JON W. DUDAS
*Director of the United States Patent and Trademark Office*